(12) United States Patent
Watson et al.

(10) Patent No.: US 12,542,683 B2
(45) Date of Patent: Feb. 3, 2026

(54) AUTHENTICATION USING GROUP SIGNATURES OF USER DEVICES

(71) Applicant: Visa International Service Association, San Francisco, CA (US)

(72) Inventors: Gaven Watson, Palo Alto, CA (US); Kim Wagner, Sunnyvale, CA (US); Maliheh Shirvanian, Cupertino, CA (US); Saikrishna Badrinarayanan, Fremont, CA (US); Srinivasan Raghuraman, Cambridge, MA (US); Sunpreet Arora, Union City, CA (US)

(73) Assignee: Visa International Service Association, San Francisco, CA (US)

( * ) Notice: Subject to any disclaimer, the term of this patent is extended or adjusted under 35 U.S.C. 154(b) by 99 days.

(21) Appl. No.: 18/578,199

(22) PCT Filed: Nov. 9, 2021

(86) PCT No.: PCT/US2021/058585
§ 371 (c)(1),
(2) Date: Jan. 10, 2024

(87) PCT Pub. No.: WO2023/003582
PCT Pub. Date: Jan. 26, 2023

(65) Prior Publication Data
US 2024/0340186 A1    Oct. 10, 2024

Related U.S. Application Data

(60) Provisional application No. 63/224,387, filed on Jul. 21, 2021.

(51) Int. Cl.
*H04L 9/32* (2006.01)
*H04L 9/06* (2006.01)
*H04L 9/30* (2006.01)

(52) U.S. Cl.
CPC .......... *H04L 9/3255* (2013.01); *H04L 9/0618* (2013.01); *H04L 9/3013* (2013.01)

(58) Field of Classification Search
CPC . H04L 63/1433; H04L 63/20; H04L 63/1441; H04L 63/102; H04L 63/08;
(Continued)

(56) References Cited

U.S. PATENT DOCUMENTS 6,914,905 B1 * 7/2005 Yip .......................... H04L 61/35
370/395.53
7,664,879 B2 * 2/2010 Chan ....................... H04L 67/14
711/113

(Continued)

FOREIGN PATENT DOCUMENTS

| EP | 3637726 | 4/2020 |
|---|---|---|
| WO | 2020/072882 A1 | 4/2020 |
| WO | 2021011160 A1 | 1/2021 |

OTHER PUBLICATIONS

Backes et al., "Membership Privacy for Fully Dynamic Group Signatures", International Association for Cryptologic Research, Available online at: http://eprint.iacr.org/2018/641.pdf, Jun. 29, 2018, pp. 1-35.

(Continued)

*Primary Examiner* — Sharif E Ullah
(74) *Attorney, Agent, or Firm* — Kilpatrick Townsend & Stockton LLP

(57) ABSTRACT

A method is disclosed. The method includes generating, by a first user device in association with a second user device, a second secret key on the second user device. The second secret key is derived from a first secret held by the first user device. The method includes generating a first commitment, transmitting, to the second user device, the first commitment, receiving, from the second user device, a second commitment, receiving, from the second user device, a (Continued)

random value and a ciphertext. The ciphertext is generated using the first commitment, the second commitment, and the random value. The method also includes verifying the ciphertext, and in response to verifying the ciphertext, modifying a group to include the second user device.

20 Claims, 7 Drawing Sheets

(58) Field of Classification Search
CPC . H04L 63/10; H04L 2209/38; H04L 63/1416; H04L 2209/46; H04L 2209/805; H04L 41/046; H04L 41/0893; H04L 41/12; H04L 41/145; H04L 41/16; H04L 63/0853; H04L 63/104; H04L 63/1425; H04L 63/205; H04L 63/0272; H04L 61/1511; H04L 63/0236; H04L 67/563; H04L 9/3255; G06F 2221/2101; G06F 21/552; G06F 21/554; G06F 21/56; G06F 21/566; G06F 2221/034; G06F 21/57; G06F 21/577; G06F 21/602; G06F 21/6209; G06F 21/6218; G06F 8/61; G06F 21/44; G06F 21/64; H04W 12/06; H04W 12/08; H04W 12/0027; H04W 12/00505; H04W 12/0609
USPC ........ 713/150, 163, 176, 181; 726/2, 21, 36; 380/255, 264, 276
See application file for complete search history.

(56) References Cited

U.S. PATENT DOCUMENTS

| | | | | |
|---|---|---|---|---|
| 7,712,023 B1* | 5/2010 | Bryan | ............... | G06F 40/174 705/31 |
| 7,725,934 B2* | 5/2010 | Kumar | ............... | H04L 63/0245 713/188 |
| 7,958,349 B2* | 6/2011 | Parkinson | ............... | H04L 63/20 713/158 |
| 7,962,582 B2* | 6/2011 | Potti | ............... | H04L 67/02 370/400 |
| 8,010,085 B2* | 8/2011 | Apte | ............... | G06F 21/577 709/227 |
| 8,245,141 B1* | 8/2012 | Fuller | ............... | H04L 63/104 715/741 |
| 8,453,159 B2* | 5/2013 | Appelbaum | ...... | G06F 16/24565 709/229 |
| 8,464,335 B1* | 6/2013 | Sinha | ............... | G06F 21/51 713/153 |
| 8,656,154 B1* | 2/2014 | Kailash | ............... | H04L 63/0807 713/168 |
| 8,769,268 B2* | 7/2014 | Morozov | ............... | G06F 21/74 718/107 |
| 8,868,757 B1* | 10/2014 | Liu | ............... | H04L 67/563 709/227 |
| 8,869,259 B1* | 10/2014 | Udupa | ............... | H04L 63/20 726/10 |
| 8,869,262 B2* | 10/2014 | Mullick | ............... | H04L 63/0876 709/227 |
| 8,955,091 B2* | 2/2015 | Kailash | ............... | H04L 63/1425 726/11 |
| 9,065,800 B2* | 6/2015 | Devarajan | ............... | G06F 21/56 |
| 9,100,424 B1* | 8/2015 | Thomas | ............... | H04L 67/1095 |
| 9,124,586 B2* | 9/2015 | Randriamasy | ........ | H04L 67/101 |
| 9,344,393 B2* | 5/2016 | Boynton | ............... | H04L 63/0272 |
| 9,497,220 B2* | 11/2016 | Cardamore | ............... | H04W 12/084 |
| 9,531,758 B2* | 12/2016 | Devarajan | ............... | H04L 63/20 |
| 9,654,507 B2* | 5/2017 | Gangadharappa | ...... | H04L 63/20 |
| 9,712,486 B2* | 7/2017 | Johnson | ............... | H04W 4/70 |
| 9,882,767 B1* | 1/2018 | Foxhoven | ............... | H04L 61/4552 |
| 9,935,955 B2* | 4/2018 | Desai | ............... | H04L 67/02 |
| 10,009,391 B1* | 6/2018 | Smith | ............... | H04L 67/02 |
| 10,044,719 B2* | 8/2018 | Desai | ............... | H04L 63/20 |
| 10,091,169 B2* | 10/2018 | Cohen | ............... | H04L 67/10 |
| 10,142,362 B2* | 11/2018 | Weith | ............... | H04L 63/20 |
| 10,313,397 B2* | 6/2019 | Komu | ............... | H04L 63/20 |
| 10,333,988 B2* | 6/2019 | Porras | ............... | H04L 63/107 |
| 10,630,489 B2* | 4/2020 | Hughes | ............... | H04L 9/3268 |
| 10,637,724 B2* | 4/2020 | Johnson | ............... | H04W 12/062 |
| 11,316,902 B2* | 4/2022 | Andrews | ............... | H04L 63/20 |
| 11,720,700 B2* | 8/2023 | Kozlowski | ............. | G06F 21/44 |
| 2002/0091921 A1* | 7/2002 | Kunzinger | ........... | H04L 63/0471 713/153 |
| 2003/0028616 A1* | 2/2003 | Aoki | ............... | H04L 67/02 709/217 |
| 2005/0088977 A1* | 4/2005 | Roch | ............... | H04L 47/10 370/254 |
| 2006/0004844 A1* | 1/2006 | Rothschiller | ......... | G06F 40/143 707/999.102 |
| 2006/0069656 A1* | 3/2006 | Horikiri | ............... | H04N 7/15 348/E7.083 |
| 2006/0268758 A1* | 11/2006 | Serani | ............... | H04L 63/08 370/320 |
| 2011/0276875 A1* | 11/2011 | McCabe | ............... | G06Q 10/10 715/255 |
| 2011/0307694 A1* | 12/2011 | Broustis | ............... | H04L 63/0884 713/169 |
| 2012/0255036 A1* | 10/2012 | Kidder | ............... | H04L 63/08 726/29 |
| 2013/0291071 A1* | 10/2013 | Blom | ............... | H04L 9/3271 726/4 |
| 2013/0318589 A1* | 11/2013 | Ford | ............... | H04L 63/10 726/7 |
| 2014/0026206 A1* | 1/2014 | Pazhyannur | ......... | H04W 12/06 726/12 |
| 2014/0164542 A1* | 6/2014 | McCabe | ............... | G06Q 10/10 709/206 |
| 2014/0181513 A1* | 6/2014 | Marek | ............... | H04L 63/105 713/168 |
| 2014/0189483 A1* | 7/2014 | Awan | ............... | H04L 63/08 715/212 |
| 2014/0245015 A1* | 8/2014 | Velamoor | ............. | H04L 63/108 713/171 |
| 2014/0259093 A1* | 9/2014 | Narayanaswamy | .... | H04L 47/20 726/1 |
| 2014/0304836 A1* | 10/2014 | Velamoor | ............. | G06F 21/6209 726/28 |
| 2015/0067464 A1* | 3/2015 | McCabe | ............... | G06Q 10/10 715/224 |
| 2015/0074776 A1* | 3/2015 | Gonser | ............... | G06F 21/64 726/6 |
| 2015/0213404 A1* | 7/2015 | Follis | ............... | G06F 21/6209 705/317 |
| 2016/0019281 A1* | 1/2016 | Hariharan | ........... | G06F 16/2452 707/783 |
| 2017/0054594 A1* | 2/2017 | Decenzo | ............... | H04L 69/18 |
| 2017/0270320 A1* | 9/2017 | Petrogiannis | ........... | G06F 21/30 |
| 2018/0024807 A1* | 1/2018 | Martin | ............... | G06V 30/414 715/753 |
| 2018/0121667 A1* | 5/2018 | Karpel | ............... | G06F 40/18 |
| 2018/0309795 A1* | 10/2018 | Ithal | ............... | H04L 63/029 |
| 2018/0316723 A1* | 11/2018 | Murgia | ............... | H04L 63/0428 |
| 2018/0359323 A1* | 12/2018 | Madden | ............... | H04L 67/104 |
| 2020/0067984 A1* | 2/2020 | Fausak | ............... | H04L 63/08 |
| 2020/0175080 A1* | 6/2020 | Bethge | ............... | G06F 16/93 |
| 2020/0322338 A1* | 10/2020 | Peterson | ............... | G06F 21/604 |
| 2020/0322357 A1* | 10/2020 | Bryan | ............... | H04L 63/1408 |
| 2021/0083862 A1* | 3/2021 | Pointcheval | .......... | H04L 9/0618 |
| 2021/0203491 A1* | 7/2021 | Wei | ............... | H04W 12/043 |
| 2021/0281419 A1* | 9/2021 | Steeves | ............... | G06F 16/2379 |
| 2022/0147948 A1* | 5/2022 | Radhakrishnan | ...... | G06N 3/084 |

OTHER PUBLICATIONS

EP21951100.3 , "Extended European Search Report", Oct. 16, 2024, 10 pages.

(56) References Cited

OTHER PUBLICATIONS

Nick et al., "MuSig-DN: Schnorr Multi-Signatures with Verifiably Deterministic Nonces", Proceedings of the 33rd Annual ACM Symposium on User Interface Software and Technology, Nov. 9-13, 2020, pp. 1717-1731.
PCT/US2021/058585, "International Search Report and Written Opinion", Apr. 18, 2022, 10 pages.
Gennaro et al., "Fast Multiparty Threshold ECDSA with Fast Trustless Setup", IACR Cryptol. ePrint Arch. 2019: 114 (2019), 31 pages.

* cited by examiner

AUTHENTICATION USING GROUP SIGNATURES OF USER DEVICES

CROSS-REFERENCES TO RELATED APPLICATIONS

This application is a National Stage of International Application No. PCT/US2021/058585, filed Nov. 9, 2021, which claims priority to U.S. Provisional Application No. 63/224,387, filed on Jul. 21, 2021, which are herein incorporated by reference.

BACKGROUND

Passwords are difficult to remember, easy to guess, and prone to hacking. According to LastPass's recent survey that surveyed 3,250 respondents globally, 66% of respondents use the same password for their accounts even when 91% of them know that it is a potential security risk. To make matters worse, only about 54% and 29% of them use multi-factor authentication methods to secure their personal and work accounts, respectively. Implementation of inadequate security measures in password-based authentication systems continue to give users many problems. CyberNews recently reported the largest leak of 8.4 million password entries online.

While there have been several attempts to solve the aforementioned problems commonly associated with passwords, one of the most successful ones to date has been by the Fast Identity Online (FIDO) alliance. FIDO introduced a series of protocols that combine local authentication on a user device with remote validation on relying party servers using public-key cryptography. These protocols are being increasingly adopted by device vendors as well as by relying parties such as banks and merchants for remote user authentication.

However, a problem with FIDO protocols is in a complete reliance on a single user device for local authentication. More specifically, the private key used for signing relying party challenges can only be stored on a single device. Each FIDO authenticator key is linked uniquely to a relying party service, and as a result, a lost or stolen user device necessitates creation of new user account, using a new device, with each relying party service.

Further, if new user devices are to be added to a group of otherwise managed, such new user devices need to register with the relying party. This can be difficult and can require a number of extra steps. It can also require constant connectivity with the relying party.

Embodiments of the disclosure address this problem and other problems individually and collectively.

SUMMARY

Embodiments include a delegated authentication system and related methods. Embodiments use a dynamic manager-less group signature (MGS) scheme that organizes authenticators in a group. Each authenticator can be on a different user device and has a unique private key that can be used to sign relying party challenges and has the ability (through collaboration) to change the group structure. The relying party server has a group verification key that can be used to validate challenges signed using the private key of any authenticator or user device in a group of user devices.

One embodiment of the invention includes a method comprising: receiving, by a first user device, challenge from a server computer storing a group verification key, the first user device storing a first secret key and being part of a group of user devices; signing, by the first user device, the challenge from the server computer to produce signed challenge, wherein the server computer verifies the signed challenge using the group verification key; and performing, by the first user device one or more managerial actions with respect to the group of user devices.

Another embodiment of the invention includes a first user device comprising: a processor; and a computer readable medium comprising code executable by the processor for performing the above method.

Another embodiment of the invention includes a system comprising: a group of user devices comprising at least a first user device and a second user device, the first user device comprising: a processor; and a computer readable medium comprising code executable by the processor for performing operations including: receiving a challenge from a server computer storing a group verification key, the first user device storing a first secret key and being part of a group of user devices; signing the challenge from the server computer to produce signed challenge, wherein the server computer verifies the signed challenge using the group verification key; and performing one or more managerial actions with respect to the group of user devices.

Another embodiment of the invention comprises a method for authenticating an interaction using a manager-less group of devices, the method comprising: receiving, by a client computer from a server computer, a challenge; transmitting, by the client computer, the challenge to a group of user devices including a first user device and a second user device, wherein the first user device added the second user device to the group of user devices, and the first user device stores a first secret key and the second user device stores a second secret key, the first secret key and the second secret key capable of signing a challenge that is verifiable by a group verification key; receiving, by the client computer from at least one of the devices in the group, a signed challenge; and transmitting, by the client computer to the server computer, or other devices within the group, the signed challenge, wherein the server computer verifies the signed challenge using the verification key.

Another embodiment of the invention includes a method comprising: providing, by a second user device to a first user device storing a first secret key, a request to be added to a group; receiving, by the second user device from the first user device, input parameters comprising an altered first user device value generated using at least the first secret key, the verification key, a modulus value, and a scaling parameter; generating, by second user device, a second secret key using the altered first user device value, the modulus value and a random number chosen in a space defined by the modulus value, and the scaling parameter; and storing, by the second user device, the second secret key, wherein the second user device is then added as a member of the group, wherein the first secret key and the second secret key are different and can sign a challenge, which can be verified by the group verification key.

Another embodiment of the invention includes a user device comprising a processor, and a computer readable medium comprising code executable by the processor, to perform the above method.

A better understanding of the nature and advantages of embodiments of the invention may be gained with reference to the following detailed description and accompanying drawings.

DETAILED DESCRIPTION

Figure 1:
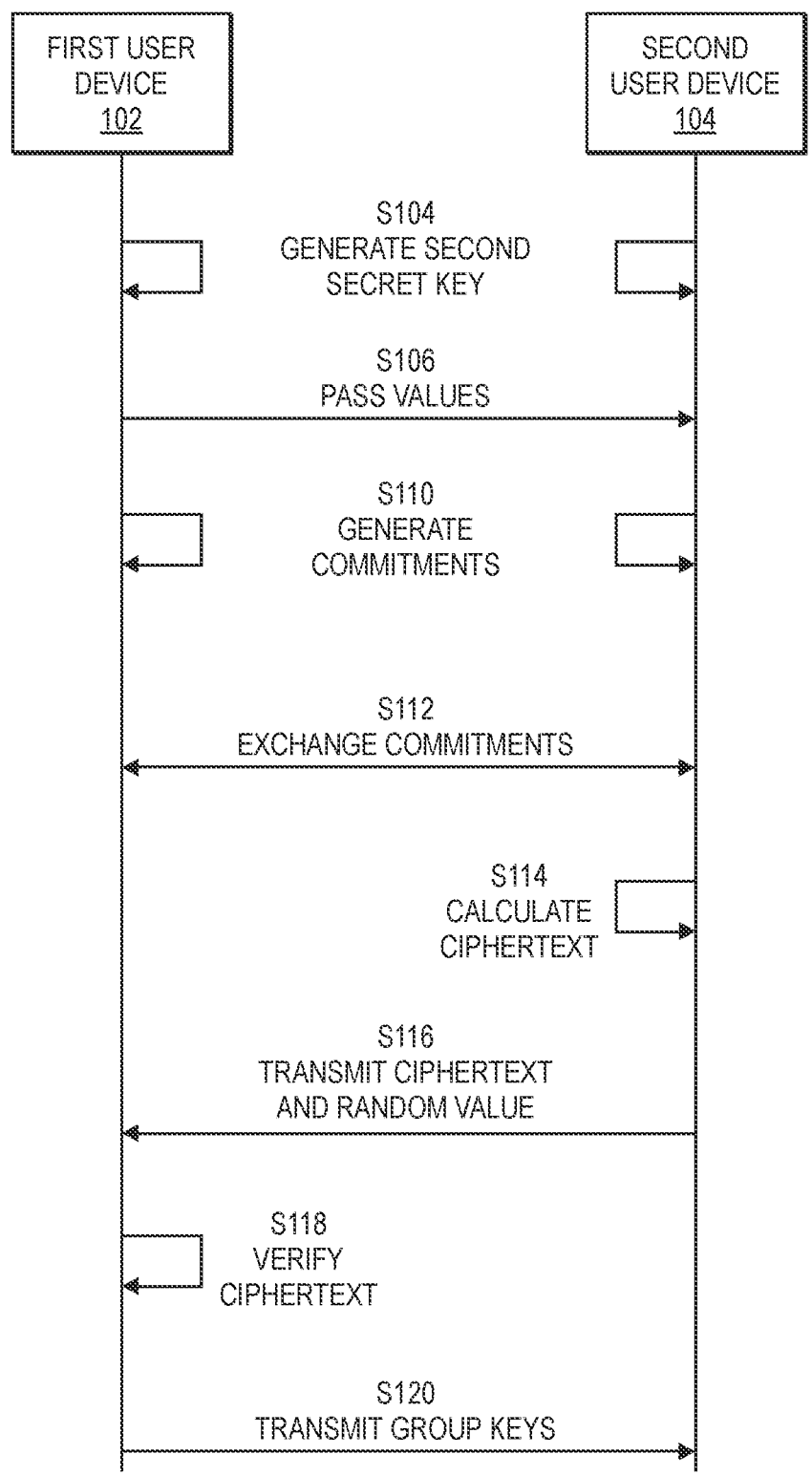
FIG. 1 shows a system and a flow diagram illustrating a method of a first user device adding a second user device to a group.

Prior to discussing embodiments of the disclosure, some terms can be described in further detail.

A "user" may include an individual. In some embodiments, a user may be associated with one or more user devices.

A "user device" may be any suitable device that is operated by a user. User devices may be in any suitable form. Some examples of user devices include cellular phones, authentication devices, smart watches, PDAs, personal computers (PCs), tablet computers, and the like. In some embodiments, where a user device is a mobile device, the mobile device may include a display, a memory, a processor, a computer-readable medium, and any other suitable component. A mobile communication device can be an example of a user device.

A "mobile communication device" may comprise any suitable electronic device that may be transported and operated by a user, which may also optionally provide remote communication capabilities to a network. Examples of remote communication capabilities include using a mobile phone (wireless) network, wireless data network (e.g. 3G, 4G or similar networks), Wi-Fi, Bluetooth, Bluetooth Low Energy (BLE), Wi-Max, or any other communication medium that may provide access to a network such as the Internet or a private network. Examples of mobile communication devices include mobile phones (e.g. cellular phones), PDAs, tablet computers, net books, laptop computers, wearable devices (e.g., watches), vehicles such as automobiles and motorcycles, personal music players, handheld specialized readers, etc. A mobile communication device may comprise any suitable hardware and software for performing such functions, and may also include multiple devices or components (e.g. when a device has remote access to a network by tethering to another device—i.e. using the other device as a modem—both devices taken together may be considered a single mobile communication device).

A "secret" can be information that is not known or unseen by others. A secret may only be known to a user. For example, a PIN, password, biometric sample biometric template, or other data specific to and/or only known to a user may be a secret.

"Management actions" can be actions that are undertaken to manage a group of members. The members may be user devices, and examples of management actions may be adding a member to a group or revoking membership of a member of the group.

A "key" may include a piece of information that is used in a cryptographic algorithm to transform input data into another representation. A cryptographic algorithm can be an encryption algorithm that transforms original data into an alternate representation, or a decryption algorithm that transforms encrypted information back to the original data. Examples of cryptographic algorithms may include triple data encryption standard (TDES), data encryption standard (DES), advanced encryption standard (AES), etc.

A "public key" may include an encryption key that may be shared openly and publicly. The public key may be designed to be shared and may be configured such that any information encrypted with the public key may only be decrypted using a private key associated with the public key (i.e., a public/private key pair).

A "private key" may include any encryption key that may be protected and secure. A private key may be securely stored at an entity and may be used to decrypt any information that has been encrypted with an associated public key of a public/private key pair associated with the private key.

A "public/private key pair" may refer to a pair of linked cryptographic keys generated by an entity. The public key may be used for public functions such as encrypting a message to send to the entity or for verifying a digital signature which was supposedly made by the entity. The private key, on the other hand may be used for private functions such as decrypting a received message or applying a digital signature. In some embodiments, the public key may be authorized by a body known as a Certification Authority (CA) which stores the public key in a database and distributes it to any other entity which requests it. The private key can typically be kept in a secure storage medium and will usually only be known to the entity. Public and private keys may be in any suitable format, including those based on Rivest-Shamir-Adleman (RSA) or elliptic curve cryptography (ECC).

A "commitment" may include cryptographic primitive that allows one to commit to a chosen value (or chosen statement) while keeping it hidden to others, with the ability to reveal the committed value later. Commitment schemes are designed so that a party cannot change the value or statement after they have committed to it: that is, commitment schemes are binding.

A "processor" may refer to any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or Xscale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

Group signature schemes are signature schemes associated with some set of parties called a group. Members of the group (either individually, or based on some group structure) are able to produce signatures on messages that can be verified as being generated by the group, using what is known as the group public key, or group verification key. Members generate signatures using their own group member signing keys, or group secret key (gsk). In embodiments of the invention, user devices used to authenticate or sign in would be the members of the group, while the relying party, or the server computer, would be the one with the group verification key to verify the signatures produced by the user devices in the group. The user devices would generate signatures using their own unique secret key.

In embodiments of the invention, a user may operate a user device. The user device may be enrolled with a relying party operating a relying party server computer and may be provided with a public/private key pair. The public key of the public/private key pair may be sent to the relying party server computer and stored by the relying party server computer. The relying party server computer may use the public key to verify messages signed using the secret key of the user device.

The user may, however, operate multiple user devices. For example, the user may operate a mobile device such as a phone, a hardware authentication device (e.g., YubiKey), and a smart watch. The user may wish to use more than one of the user devices to perform authentication, and may enroll the additional user devices with the relying party server computer. It is desirable to do so, however, without requiring each user device to contact the relying party server computer for each action to be performed.

In one example, the user registers, or enrolls, their mobile device and smart watch with the relying party operating a relying party computer. The user devices may use a KeyGen protocol to generate a first private key $sk_1$ for the mobile device, and a second private key $sk_2$ for the smart watch. Both the first private key $sk_1$ and the second private key $sk_2$ may be generated such that they can be authenticated by a group verification key gvk. A user device that generates or obtains a private key may securely store the private key and may ensure that the private key does not leave the user device. In addition to generating signatures on challenges from the relying party server computer, the user devices in the group can perform managerial actions (e.g., add member or revoke member) that would conventionally be performed by a relying party server computer.

Embodiments of the invention include dynamic group signature schemes that allow for a group structure to change with time. Because contact with the relying party server computer is not needed on a consistent basis, embodiments of the invention can be characterized as being a "managerless" group signature scheme. In particular, in embodiments of the invention, it is possible to add new members to the group, as well as revoke signing privileges of a user device or user (either individually or as a part of the group structure) and their membership within the group, without the actions of the relying party server computer.

Embodiments of the invention introduce the idea of expanding the space of signing keys. Embodiments of the invention can include many functionally equivalent signing keys for any given verification key. Embodiments of the invention can also have the property that given any one signing key corresponds to a verification key, it is possible to generate another random functionally equivalent signing key. To do so, the following generic ideal functionality in a re-randomizable function $\mathcal{F}_{ReRand}$ can be described with respect to the pseudocode below.

---

$\mathcal{F}_{ReRand}$
A has (vk, $sk_A$) ← Σ.KeyGen ($1^\lambda$) for a signature scheme Σ.
B wants a random signing key $sk_B$ corresponding to vk.
Inputs: pub = vk, $inp_A$ = $sk_A$, $inp_B$ = ⊥
Outputs: $outp_B$ = $sk_B$ uniformly distributed subject to the constraint that, for all m, r.
Σ.Ver (m, Σ.Sign (m, $sk_B$; r), vk) = 1.

---

The pseudocode explains a scenario where a first user device A generates a new key for a second user device B. The first user device A would already have a verification key (vk) and a unique secret key of the first user device A ($sk_A$). They may have been generated using a key generation protocol (KeyGen). The first user device A would use its first secret key ($sk_A$) to generate a random signing key or secret key of the second user device B ($sk_B$) corresponding to the verification key (vk).

Embodiments of the invention can include modified key generation processes $\mathcal{F}_{ReRand-Schnorr}$ and $\mathcal{F}_{ReRand-ElGamal}$. These can be based on the Schnorr and El Gamal signature schemes, respectively. Before discussing these modified key generation processes, descriptions of the basic Schnorr and El Gamal signature schemes are provided.

Exemplary pseudocode of the Schnorr signature scheme is below. Further details can also be found in C. Schnorr, "Efficient identification and signatures for smart cards," in Advances in Cryptology—CRYPTO '89, $9^{th}$ Annual International Cryptology Conference, Santa Barbara, California, USA, August 20-24, 1989, Proceedings, ser. Lecture Notes in Computer Science, G. Brassard, Ed., vol. 435. Springer, 1989, pp. 239-252, which is incorporated by reference.

---

KeyGen($1^\lambda$): Samples a random x ← $\mathbb{Z}_q$ and sets sk = x and vk = $g^x$.
Sign(m; sk = x): Samples a random r ← $\mathbb{Z}_q$ and sets e = Hash($g^r$ || m),
S = r − xe and σ = (s, e).
Ver(m, (s, e); vk): Checks if e = Hash($g^s vk^e$ || m).

---

In the above pseudocode, the following elements are mentioned: secret key (sk); nonce (r); verification key (vk or $g^x$); committed nonce value ($g^r$); message (m) output siglet (s); generator (g); and challenge (e).

The key generation (KeyGen) protocol, which can be run by an authenticator associated with a user device, samples a random value (x) in the space defined by the prime order (q), which becomes the secret key (sk) of the member. The verification key (vk) is obtained using the secret key (sk) and the generator (g).

The signature (Sign) protocol, which can be run by the authenticator associated with the user device, samples a random nonce (r) in the space defined by the prime order (q), and generates a committed nonce value ($g^r$) using the generator (g).

The committed nonce value ($g^r$) is concatenated with the message (m) and is hashed to generate the challenge (e). The challenge (e) may have been received from a server computer. The challenge (e) is used by the authenticator associated with the user device along with the nonce (r) and the secret key (x) to generate a siglet (s). The siglet (s) and the challenge (e) can constitute a signature (σ), and can be sent by the authenticator associated with the user device to the server computer for the verification.

The verification (Ver) protocol uses the message m, the signature (σ) including the siglet (s) and the challenge (e), and the verification key (vk) as inputs. If e=Hash($g^s vk^e \| m$), then the signature (σ) is verified. The protocol outputs "1" to indicate success and "0" for failure.

The following $\mathcal{F}_{ReRand-Schnorr}$ protocol can be used to generate a secret key for the new device B ($sk_B$) using the secret key for the device A ($sk_A$). The inputs can include the following:

---

$\mathbb{G}$ (a group), q(prime order), M (scaling parameter), and vk (verication key).

$\mathcal{F}_{ReRand-Schnorr^*}$
A has a key-pair (vk, $sk_A$) ← $\Sigma_{Schnorr}^*$.KeyGen($1^\lambda$)
B wants a random signing key $sk_B$ corresponding to vk.
Inputs: pub = ($\mathbb{G}$, q, M, vk), $inp_A$ = $sk_A$, $inp_B$ = ⊥
Protocol:
1) A computes and sends x = ($sk_A$ mod q) to B.
2) B samples random y ← $\mathbb{Z}_M$.
3) B outputs $sk_B$ = x + yq.
Outputs: $outp_A$ = ⊥, $outp_B$ = $sk_B$

---

The second user device (B) provides a request to be added to a group (G) to a first user device (A), which is part of the group (G). The first user device (A) stores a first secret key ($sk_A$).

Upon receiving the request from the second user device B, the first user device A forms a value (x) using the equation $sk_A$ mod q. The value (x) may be characterized as being an altered value of the first secret key value ($sk_A$). The value (x) is then sent to the second user device (B).

Upon receiving the value (x) from the first user device A, the second user device (B) generates a nonce (y) based on the scaling parameter (M). The second user device (B) uses this nonce (y), along with the modulus value (q) and the value (x) to generate a second secret key ($sk_B$) using the equation $sk_B$=x+yq.

The second user device (B) stores the second secret key ($sk_B$), and the second user device (B) is then added as a member of the group. The first secret key ($sk_A$) and the second secret key ($sk_B$) are different and can sign the same data, which can be verified by the same group verification key (vk). Note that the second user device (B) can be added to the group (G) without contacting a relying party server computer.

In embodiments of the invention, the Schnorr signature scheme can be modified to accommodate the new second secret key ($sk_B$). Specifically, the Sign and KeyGen protocols of the Schnorr signature scheme can be changed to accommodate for the expanded space of signing keys, as shown below.

---

KeyGen($1^\lambda$): Samples a random x ← $\mathbb{Z}_{Mq}$ and sets sk = x and vk = $g^{x \bmod q}$.
Sign(m, sk = x): Samples a random r ← $\mathbb{Z}_q$ and sets e = Hash($g^r \| m$), S = (r − xe) mod q and σ = (s, e).
Ver(m, (s, e), vk): Checks if e = Hash($g^s vk^e \| m$).

---

Exemplary pseudocode for the El Gamal signature scheme is provided below. Further details can be found in T. E. Gamal, "A public key cryptosystem and a signature scheme based on discrete logarithms," IEEE Trans. Inf. Theory, vol. 31, no. 4, pp. 469-472, 1985, which is incorporated by reference. It is divided into three sections: KeyGen, Sign, and Ver.

---

KeyGen($1^\lambda$): Samples a random
x ← $\mathbb{Z}_q^*$ and sets sk = x and vk = $g^x$.
Sign(m; sk = x): Samples a random
r ← $\mathbb{Z}_q^*$ such that (r, q − 1) = 1 so that
$r^{-1}$mod(q − 1) exists. Set s = $g^r$,
e = $r^{-1}$(Hash(m) − xs) mod (q − 1) and
σ = (s, e).
Ver(m, (s, e); vk): Checks if $g^{Hash(m)}$ = $vk^s s^e$.

---

The key generation (KeyGen) protocol samples a random value (x) in the space defined by the modulo of prime q, which becomes the secret key (sk) of the member. The verification key (vk) is created using $g^x$ where x is the secret key (sk) and (g) is a generator.

The signature (Sign) protocol samples a random nonce (r) in the space defined by the modulo prime order (q) as shown above, and then generates a value (s) using the nonce (r) and the generator (g). The value (s) can be a siglet value and can be considered a committed nonce value for nonce r. The challenge (e) is then generated using the equation e=$r^{-1}$(Hash(m)−xs) mod (q−1). The signature (σ) including the siglet value (s) and the challenge (e) can be sent by a user device to the server computer for verification.

The verification protocol (Ver) uses the message m, and the signature (σ) including the siglet (s) and the challenge (e), and the verification key (vk). To verify the signature, the following equation is used: $g^{Hash(m)}$=$vk^s s^e$. The protocol outputs "1" to indicate success and "0" for failure.

The following key generation function, $\mathcal{F}_{ReRand-ElGamal}$, is based on the El Gamal process, and generates a new second secret key ($sk_B$) for a new second user device B using a first secret key ($sk_A$) for a first user device A.

---

$\mathcal{F}_{ReRand-ElGamal^*}$
A has a key-pair (vk, $sk_A$) ← $\Sigma_{ElGamal}^*$.KeyGen($1^\lambda$)
B wants a random signing key $sk_B$ corresponding to vk.
Inputs: pub = ($\mathbb{G}$, q, M, vk) $inp_A$ = $sk_A$, $inp_B$ = ⊥
Protocol:
1) A computes and sends x = $sk_A$ mod (q − 1) to B.
2) B samples random y ← $\mathbb{Z}_M$.
3) B outputs $sk_B$ = x + y(q − 1).
Outputs: $outp_A$ = ⊥, $outp_B$ = $sk_B$

---

The pseudocode above shows a process for adding a new second secret key ($sk_B$) for a second user device B using a first secret key ($sk_A$) of a first user device A. The El Gamal signature scheme can be modified as shown below to accommodate for the expanded space of signing keys.

---

KeyGen($1^\lambda$): Samples a random
x ← $\mathbb{Z}_{M(q-1)}$ and sets sk = x and vk = $g^{x \bmod (q-1)}$.
Sign(m; sk = x): Samples a random
r ← $\mathbb{Z}_q^*$ such that (r, q − 1) = 1 so that
$r^{-1}$mod(q − 1) exists and sets s = $g^r$,
e = $r^{-1}$(Hash(m) − xs)mod(q − 1)
and σ = (s, e).
Ver(m, (s, e); vk): Checks if $g^{Hash(m)}$ = $vk^s s^e$.

---

In the key generation (KeyGen) protocol, the secret key (x) or (sk) is determined using both the scaling parameter (M) and modulo of prime (q) minus one (q−1). The verification key (vk) is generated using the equation vk=$g^{x \bmod (q-1)}$. The following change in the generation of verification key (vk) would produce the same verification key (vk) for all the additional secret keys (sk) that will be generated using $\mathcal{F}_{ReRand-ElGamal}$.

The signature (Sign) protocol samples a random nonce (r) in the space defined by the modulo prime order (q), and then generates a value (s) using the nonce (r) and the generator (g). The value (s) can be a siglet value and can be considered a committed nonce value for nonce r. The challenge (e) is then generated using the equation $e=r^{-1}(Hash(m)-xs)$ mod (q-1). The signature (σ) including the siglet value (s) and the challenge (e) can be sent by a user device to the server computer for verification.

The verification protocol (Ver) uses the message m, and the signature (σ) including the siglet (s) and the challenge (e), and the verification key (vk). To verify the signature, the following equation is used: $g^{Hash(m)}=vk^s s^e$. The protocol outputs "1" to indicate success and "0" for failure.

As noted above, embodiments of the invention can allow each member, or device, in the group to generate a new secret key to add a new member using its own secret key. Embodiments of the invention can use a dynamic managerless group signature scheme in which the members of the group can function as managers, and can perform managerial functions such as adding a member to the group, revoking member's membership to the group, and/or verifying signatures. The managerless group signature can achieves security properties including unforgeability, anonymity, traceability, and revocability.

Embodiments of the invention can include a number of protocols including managerial functions. Such functions can include key generation (KeyGen), add member (AddMember), signature (Sign), signature open (SigOpen), revoke member (RevokeMember), and verification (Ver). It is assumed that only the members (e.g., devices and/or authenticators) in the managerless group can use these protocols.

When adding devices for the first time, an enrollment process is performed. The enrollment process can be a process of signing up to the authentication protocol offered by the server computer and introducing the first authenticator(s) or first user device(s). For example, the (gsk$_i$ gvk) key pair is generated on a first user device i using the group signature KeyGen protocol. The first user device stores gsk$_i$ securely and gvk is transferred to the server computer. A list (Table) is created on the server computer and a first user device nickname for the first user device is added to the list. At the end of this phase, a round of authentication processing can take place to verify the enrollment. The authentication processing can be similar to enrolling in a FIDO authentication service.

In the user interaction flow according to some embodiments, the user logs into a relying party server computer using a first authentication factor (e.g., username and/or password) to enroll in the service. The server computer then sends a message to a client machine. The client machine forwards the message to all known user devices that are connected to it. The user receives a notification on all or some of the user devices. For example, the user may indicate to the server computer that only her work laptop and work smartphone will receive the notification. In this example, only these two devices will run the group signature KeyGen protocol in this example. At the end of this round, the gvk and a list of all members of the group is passed to the server computer through the client machine. The client machine and the server computer can then be updated with this information.

In some embodiments, KeyGen is a key generation protocol that determines a public group verification key (gvk), a public identity ledger, and private keys for each of the individual group members. It is typically used when one or more devices first enroll into the group. The algorithm for the protocol is as follows:

---

Sample pp←Com.Gen($1^\lambda$), crs ←
NIZK.CRSGen($1^\lambda$), (vk,sk) ←
$\Sigma_{SR}$.KeyGen($1^\lambda$) and (ek, dk) ← Γ.KeyGen($1^\lambda$).
Sample random values r, ω and
commitment com = Com(r; ω). Set gvk =
(pp, crs, vk, ek, com, Table) where
Table =⊥.
For each i ∈ [|G|],
 Run $\Pi_{ReRand}$ (playing the role of both
 parties) using input sk to obtain sk$_i$.
 Compute commitments com$_{i,1}$ =
 Com(r$_i$; ω$_i$), com$_{i,2}$ = Com(α$_i$;·) using
 randomness r$_i$, ω$_i$, α$_i$. (The "·" in
 Com(α$_i$;·) can represent a random
 value which is not necessary for the
 operation of the KeyGen routine.)
 Compute ciphertext ct$_i$ = Γ.Enc((com$_{i,1}$, com$_{i,2}$);
 ek, β$_i$) using randomness β$_i$.
 Set
  gsk$_i$ = (sk$_i$, r$_i$, ω$_i$, com$_{i,2}$, β$_i$)
  ik$_i$ = (sk$_i$, dk, r, ω)
  ok$_i$ = dk
  rk$_i$ = (r, ω, r$_i$, ω$_i$, com$_{i,2}$, β$_i$)
 Set Table$_i$ = (ct$_i$, INIT, IN).
 Add ({i}, add), ({i}, sign), ({i},
 open) and ({i}, revoke) to Π.

---

First, a user device in a group of user devices can run Γ.KeyGen($1^\lambda$) to obtain a public key ek and a secret key dk. Γ can be a CCA2-secure public encryption scheme. Then, the re-randomizable signature scheme $\Sigma_{SR}$. KeyGen($1^\lambda$) is run to obtain a verification key (vk) and a signing key (sk). A common reference string crs is then generated using NIZK.CRSGen($1^\lambda$), where NIZK is a non-interactive zero-knowledge argument, such as those described in ZKProof, "ZKProof Community Reference," Version 0.2, Ed. by D. Benarroch, L. T. A. N. Brandão, E. Tromer. Pub. by zkproof.org, Dec. 2019. After this, public parameters (pp) are sampled using Com. Gen($1^\lambda$).

The random values r, ω are then selected, and the commitment com is generated using r, ω (com=Com(r;ω)). Then, a group verification key (gvk) is formed from the values (pp, crs, vk, ek, com, Table) where Table=⊥ (meaning that the Table is empty).

The protocol goes through each member, or user device, in the group (G) to enroll each user device. The KeyGen protocol, which may be presented as software on the user device, uses the secret key (sk), generated previously along with the verification key (vk), in $\Pi_{ReRand}$ to obtain a unique, random secret key (sk$_i$).

After obtaining the unique, random secret key (sk$_i$), commitments (com$_{i,1}$ and com$_{i,2}$) are computed using random values r$_i$, ω$_i$, α$_i$.

After computing the commitments (com$_{i,1}$ and com$_{i,2}$) and the unique secret key (sk$_i$), the user device computes the ciphertext (ct$_i$) using the encryption key (ek) and a random value (β$_i$).

Upon calculating the ciphertext (ct$_i$), as shown above, four private keys can be generated: group signing key (gsk$_i$), issuing key (ik$_i$), opening key (ok$_i$), and revocation key (rk$_i$).

The four private keys can have the following features. The group signing key (gsk$_i$) can be used to generate a signature on data (e.g., a challenge). The issuing key (ik$_i$) can be used to add new members to the group. The opening key (ok$_i$) can be used to identify a member or user device that generated a signature. The revocation key (rk$_i$) can be used to revoke members in the group.

After the generation of the ciphertext ($ct_i$), the member is enrolled in the system and is included in the table on the server computer with the ciphertext ($ct_i$). The enrollment is finalized when the user device is added to the group structure ($\Pi$) to perform add, sign, open, and revoke actions.

AddMember is a protocol that adds a new member to the group and generates a private key for the new member of the group. After enrolling the first set of devices, this method can be used to add new devices to a group of devices.

Unlike the enrollment of the initial user devices, adding a new member does not require user devices to interact with the server computer. To add additional user devices to a group, the user first runs a setup process to establish a connection between a first user device, which already exists in a group, and a new second user device that is not part of the group. On any of the previously enrolled user devices, the user selects services that the new device should be enrolled with and runs the AddMember protocol to add the new group member. The system can update the device list (Table) on the server computer during the first authentication attempt from the new user second device.

The pseudocode of AddMember protocol embodiment is as follows:

---

AddMember (j; $ik_i$ = ($sk_i$, dk, r, $\omega$));
  Parties i and j run $\Pi_{ReRand}$ using $sk_i$
  as i's input with j obtaining $sk_j$. Party i
  also passes along (dk, r, $\omega$) to party j.
  Party j computes commitment $com_{j,1}$ =
  Com($r_j$; $\omega_j$) using random values
  $r_j$, $\omega_j$.
  Party i computes commitment $com_{j,2}$ =
  Com($a_j$; $r_{j,2}$) using random values
  $a_j$, $r_{j,2}$.
  Parties i and j then exchange $com_{j,1}$
  and $com_{j,2}$.
  Party j computes ciphertext
  $ct_j$=$\Gamma$.Enc(($com_{j,1}$, $com_{j,2}$); ek, $\beta_j$) using
  randomness $\beta_j$. Sends ($ct_j$, $\beta_j$) to party i.
  Party i computes $\pi \leftarrow$ NIZK.Prove
  ($stmt_{add}$; [$r_i$, $\omega_i$, $com_{i,2}$, $\beta_i$, $com_{j,1}$, $a_j$, $r_{j,2}$, $\beta_j$])
  where $stmt_{add}$ = (i, $ct_j$, gvk) and the
  relation is defined by:
  $\exists$ [$r_i$, $\omega_i$, $com_{i,2}$, $\beta_i$, $com_{j,1}$, $a_j$, $r_{j,2}$, $\beta_j$]:
    $Table_i$ = ($\Gamma$.Enc((Com($r_i$; $\omega_i$), $com_{j,2}$);
    ek, $\beta_i$),· , IN)
    $ct_j$ = $\Gamma$.Enc(($com_{j,1}$, Com($a_j$; $r_{j,2}$)); ek, $\beta_j$)
    and sets $Table_j$ = ($ct_j$, (i, $\pi$), IN).
    Party i adds j to G and ({j}, add), ({j},
    sign), ({j}, open) and
    ({j}, revoke) to $\Pi$.
  Finally, party j sets
    $gsk_j$ = ($sk_j$, $r_j$, $\omega_j$, $com_{j,2}$, $\beta_j$)
    $ik_j$ = ($sk_j$, dk, r, $\omega$)
    $ok_j$ = dk
    $rk_j$ = (r, $\omega$, $r_j$, $\omega_j$, $com_{j,2}$, $\beta_j$)

---

FIG. 1 shows a flow diagram illustrating a process corresponding to the AddMember protocol. FIG. 1 shows a first user device 102 which may be labeled (i) and is currently a member of a group. The first user device 102 wishes to add the second user device 104, which may be labeled (j) to the group. The first user device 102 and the second user device 104 can be in communication with each other via any suitable short or long range communication protocol or mechanism.

In step S104, the first user device 102 and the second user device 104 can each generate a second secret key ($sk_j$) using a first secret key ($sk_i$) of the first user device 102. The protocols for performing this step are described above. For example, the method can include generating, by the first user device 102 in association with the second user device 104, a second secret key ($sk_j$) on the second user device 104, wherein the second secret key ($sk_j$) is derived from the first secret key ($sk_i$) stored on the first user device 102.

In step S106, the first user device 102 passes along values including (dk, r, $\omega$) to the second user device 104. dk may be a decryption key, and r and $\omega$ may be random values.

In step S110, both the first user device 102 and the second user device 104 generate commitments ($com_{j,1}$ and $com_{j,2}$) using random values. In particular, the second user device 104 can generate a second commitment $com_{j,1}$=Com($r_j$;$\omega_j$) using second random values $r_j$, $\omega_j$. The first user device 102 can generate a first commitment $com_{j,2}$=Com($\alpha_j$;$r_{j,2}$) using first random values $\alpha_j$, $r_{j,2}$.

In step S112, the first user device 102 and the second user device 104 exchange the commitments that they created. For example, the first user device 102 can transmit the first commitment ($com_{j,2}$) to the second user device 104, and the second user device 104 may receive the same. The second user device 104 can transmit the second commitment ($com_{j,1}$) to the first user device 102, and the first user device 102 may receive the same.

In step S114, the second user device 104 generates ciphertext ($ct_j$) by encrypting at least the commitment ($com_{j,2}$) of the first user device 102 and its own commitment ($com_{j,1}$) using the randomness $\beta_j$ and the encryption key (ek).

In step S116, after generating the ciphertext ($ct_j$), the second user device 104 transmits the ciphertext ($ct_j$) and the randomness $\beta_j$ to the first user device 102, and the first user device 102 receives the same.

In step S118, the first user device 102 verifies the statement data in $stmt_{add}$=(i; $ct_j$; gvk), which includes ciphertext ($ct_j$) produced by the second user device 104, using a zero knowledge proof. Upon the verification, the first user device 102 adds the second user device 104 to the server's table of registered devices. The entry for the second user device 104 can be: $Table_j$=($ct_j$; (i;$\pi$); IN), where $ct_j$ is the ciphertext associated with the second user device 104, and (i;$\pi$) indicates that the first user device 102 added the second user device 104.

In step S120, the first user device 102 modifies the group G of user devices by adding the second user device 104 to the group G, along with the features of add, sign, open, and revoke to the group structure ($\Pi$). The first user device 102 also transmits the group signing key (gsk), issuing key ($ik_j$), opening key ($ok_j$), and revocation key ($rk_j$) to the second user device 104.

The AddMember protocol allows a member of a group of user devices to add a new user device to the group. This eliminates the need for the server computer to generate a new private key for a new user device that is to be added to the group. This has technical advantages including reducing the computational workload on the relying party server computer, and reducing the need for the relying party server computer to be online when a new device is added to the group. Further, greater system security is achieved, since the generation of keys for new devices is managed by different user devices in different groups. The compromise of the relying party server could not cause the entire system to be compromised.

Sign is a protocol that generates a signature for the members of the group. This signature, upon the verification by the server computer, authenticates the user device. The algorithm for the protocol is as follows:

```
Sign(m; gsk_i = (sk_i, r_i, ω_i, com_{i,2}, β_i)):
    Generate signature σ' ← Σ_SR.Sign
        (m; sk_i). Compute ciphertext ct =
        Γ.Enc([i, σ']; ek, r) using randomness r.
    Compute proof π ← NIZK.Prove
        (stmt_sign; [i, σ', r, r_i, ω_i, com_{i,2}, β_i]) where
    stmt_sign = (m, ct, gvk) and the relation
    is defined by ∃ [i, σ', r, r_i, ω_i, com_{i,2}, β_i]:
        Σ_SR.Ver(m, σ'; vk) = 1
        ct = Γ.Enc([i, σ']; ek, r)
        Table_i = (Γ.Enc((Com(r_i; ω_i),
            com_{i,2}); ek, β),· , IN) (The " · " can
            represent a value which is not
            necessary for the operation of the Sign
            subroutine.)
    Set σ = (ct, π).
```

Using the secret key ($sk_i$), the party i, or the device that's being used to sign (authenticate), signs the message m that is received from the server computer, thereby generating the temporary signature ($σ'$). This temporary signature ($σ'$) is encrypted using the encryption key (ek) and randomness r in order to hide the identity of the party that created the signature. The encrypted signature ($σ'$) produces a ciphertext (ct).

A statement $stmt_{sign}$=(m; ct; gvk), which includes the ciphertext (ct), is verified using the zero knowledge proof (NIZK) as noted above. The protocol generates an official signature (σ) containing the ciphertext (ct) and the proof (π) upon the successful verification.

The algorithm for the verification (Ver) protocol is as follows:

```
Ver(m, σ = (ct, π); gvk = (pp, crs, vk, ek, com)):
    Output NIZK.Verify(π, stmt_sign = (m, ct, gvk), crs).
```

The verification (Ver) protocol, uses as inputs, the signature (σ), the message (m), and the group verification key (gvk). It verifies the proof (π) to determine if the signature is valid.

SigOpen is a protocol that determines the members of the group who generated the signature. The algorithm for the protocol is as follows:

```
SigOpen(m, σ = (ct, π); ok_i = dk):
    Output ⊥ if Ver(m, σ; gvk) = 0. Else, compute
    plaintext [i, σ'] = Γ.Dec(ct; dk) and
    output i.
```

The protocol uses the verification (Ver) protocol to make sure that the signature (σ) is a valid or not by using the proof (π). After the verification of the signature (σ), the SigOpen protocol uses the opening key (ok), which is also the decryption key (dk), to decrypt the ciphertext (ct). By decrypting the ciphertext (ct), the protocol is able to identify the device, or the party i, that created the signature (σ).

RevokeMember is a protocol that revokes an existing member from the group. The algorithm for the protocol is as follows:

```
RevokeMember(j; rk_i = (r, ω, r_i, ω_i, com_{i,2}, β_i)):
    Compute proof π ← NIZK.Prove(stmt_revoke;
        [r, ω, r_i, ω_i, com_{i,2}, β_i]) where
    stmt_revoke = (i, gvk) and the relation is
    defined by ∃ [r, ω, r_i, ω_i, com_{i,2}, β_i]:
        com = Com(r; ω)
        Table_i = (Γ.Enc((Com(r_i; ω_i), com_{i,2});
            ek, β_i),· , IN)
    and set Table_j = (·, (i, π), OUT).
    Party i removes j from G and ({j}, sign),
    ({j}, revoke) from Π.
```

The protocol first checks whether the party i, or the first user device, that is removing second user device, is valid using the zero knowledge proof (π). Upon successful verification, the first user device, or party i, removes the second user device, or party j, from the group, along with sign and revoke protocols of party j in the group structure (Π). On the server computer's side, the server's memory, or table, gets updated by registering the second user device, or party j, as OUT.

Although the current protocol only revokes the privileges of sign and revoke, upon some kind of re-keying, it is possible to also take away the privilege of opening signatures (open) along with adding new members (add) using RevokeMember protocol.

As noted above, the following six protocols (KeyGen, AddMember, Sign, SigOpen, RevokeMember, and Ver) are components of the managerless group signature according to embodiments of the invention. Embodiments of the invention can apply a managerless group signature protocol in user authentication, either as a passwordless mechanism or as a second-factor authentication.

In some embodiments, the application of modified group signature has three main entities: 1) a client machine C (or client device) on which the user initiates a login session; 2) a relying party server computer S for enrolling and authenticating users; and 3) a group of devices (e.g., user devices) D1, . . . , Dn serving as external (roaming) authenticators. It is assumed that all these entities can run one or more applications supporting the protocol (e.g., an application on smartphone and a browser extension on the client).

In some embodiments, interaction between the server computer and the user devices can be handled through the client machine. Specifically, the client machine interacts with the server computer to receive a challenge message and pass it to a subset of user devices in the group, who will sign the challenge as evidence that registered user devices are available during authentication. The client machine receives the responses from the user devices and sends them to the server computer for verification. This interaction is described in further detail with respect to FIG. 2.

The user authentication using the modified group signature protocol can have five different components: Setup, Enrollment, Authentication, Add Member, and Revocation.

The authentication starts with a setup process which runs between the parties to establish a secure connection among them. Setup can run prior to or during new device registration.

The setup process can include the following processes:
  Setup_D: the setup process running between devices to discover each other and run a key exchange to secure their connection.
  Setup_{D-C}: the setup process running between device(s) and the client to establish a secure connection.
  Setup C-S: the client machine to server connection is secured using common techniques such as TLS over the internet.

The setup procedure can be performed by a user operating a user device. For example, the user connects the client machine (or client device) and user devices to the same network (or turns on Bluetooth), installs the client browser extension, installs the application on the user devices, connects the user devices with each other, and pairs the user devices with the client machine.

Once the setup procedure is completed, the user enrolls the user device(s) with the server computer. As explained above, the (gsk$_i$, gvk) key pair is generated on user device i using the managerless group signature KeyGen protocol. The user device stores gsk$_i$ securely and gvk is transferred to the server computer. A list (Table) is created on the server computer and a user device nickname is added to the list. At the end of this phase, a round of authentication can take place to verify the enrollment.

During this enrollment process, the user logs into the server computer using the first authentication factor (e.g., username and/or password) to enroll in the service, as there is no devices currently in the authentication system. The server computer then sends a request to the client machine for it to obtain and pass the group public key (gvk) to the server computer. The client machine forwards the message to all connected user devices known through the Setup$_{D-C}$.

The user receives a notification on all of the user devices, but may accept the notification on only one of the user devices (e.g., D$_i$), which consequently runs the group signature KeyGen protocol with all other connected devices known through Setup$_D$. This is possible as there can be several user devices that can enroll into the system.

At this stage, the user may also get the option to form a group of devices he/she wishes to correspond to the enrolling service/account. For example, the user may select only the work laptop and work smartphone to be included in the authenticator group. Hence, only the two devices run the group signature KeyGen protocol to enroll in the system, while other devices that were connected in Setup$_D$ would not be enrolled to the system. Once the user selects the group of user devices he/she wishes to correspond to enroll, the group verification key (gvk) and a list of all members of the group is passed to the server computer through the client machine, and the client machine and the server computer are updated.

Figure 2:
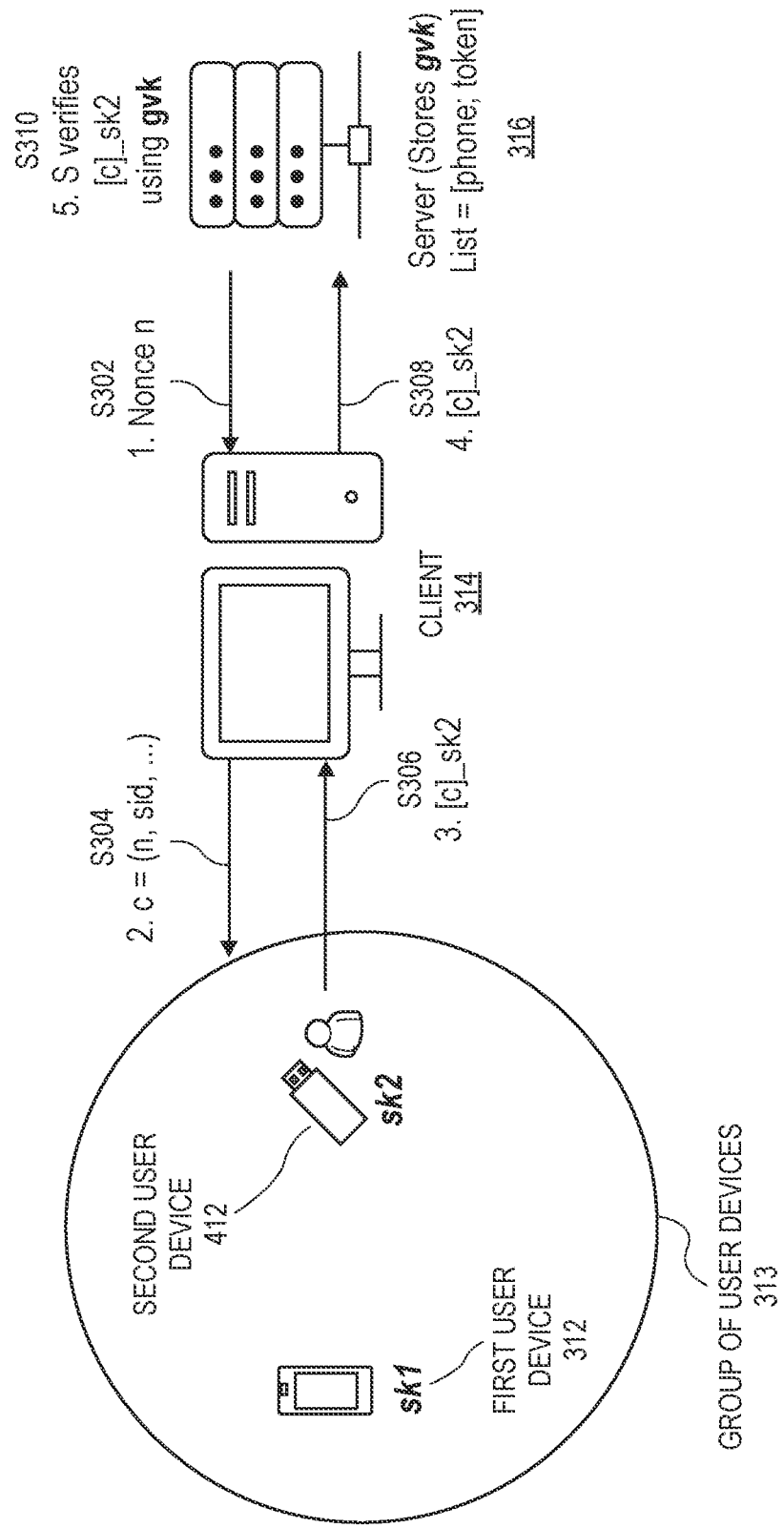
FIG. 2 shows a system and an authentication process using a user device in a group of user devices.

FIG. 2 shows an authentication process using a user device in a group of user devices. The process in FIG. 2 can be used to authenticate a user before the user is able to access a Website, make a payment, or perform some other type of activity that requires authentication.

In FIG. 2, a relying party may operate a relying party computer S316. The relying party computer S316 can be a server computer. The relying party computer S316 may store a group verification key that is able to verify signatures generated using private or secret keys associated with a group of user devices 313. The relying party computer S316 may also store a group list (e.g., phone, token) of the user devices in the group 313.

A user may communicate with the relying party computer S316 via a client terminal machine C314 with the aid of the group of user devices 313 including a first user device 312 and a second user device 412. In some embodiments, the client terminal machine C314 itself may be a user device. Each of the first and second user devices 312, 412 can be considered an authenticator and can store a secret key, known only to the specific user device 312, 412. Each of the first and second user devices 312, 412 may also store a group verification key (gvk) known to all members of the group of user devices 313 and the relying party computer S316. The user may use any of the user devices 312, 313 in the group of user devices 313 to perform an authentication process. In the example of FIG. 2, the second user device 412 is used.

In step S302, the relying party computer S316 may transmit an authentication request (e.g., a challenge) comprising a nonce n to the client terminal machine C314.

In step S304, after receiving the authentication request from the relying party computer S316, the user may select a user device from group of user devices 313 to perform the authentication process. For example, the user may select the second user device 412 to perform the authentication process. The second user device 412 can hold the second secret key sk$_2$ from the group. The second authenticator 412 may sign the nonce n and additional data (e.g., a session ID that identifies the authentication request from a plurality of authentication requests) using the second secret key sk$_2$ to form a signed challenge [c]_sk$_2$. In other embodiments, the client terminal machine C314 can send the authentication request (challenge) to all of the user devices 312, 412 in the group of user devices 313, and each user device 312, 412 can sign the challenge.

In step S306, the second authenticator (user device) 412 may transmit the signed challenge [c]_sk$_2$ to the client terminal machine C314. In some embodiments, when the client terminal machine C314 itself is an authenticator, the client terminal machine C314 may directly transmit the signed challenge [c]_sk$_2$ to the relying party computer S316.

In step S308, after receiving the signed challenge [c]_sk$_2$, the client terminal machine C314 may transmit the signed challenge [c]_sk$_2$ to the relying party computer S316.

In step S310, after receiving the challenge [c]_sk$_2$, the relying party computer S316 may identify the group verification key gvk associated with the client machine C314 or the second user device 412. The relying party computer S316 may then verify (e.g., decrypt) the challenge using the group verification key gvk.

Figure 3:
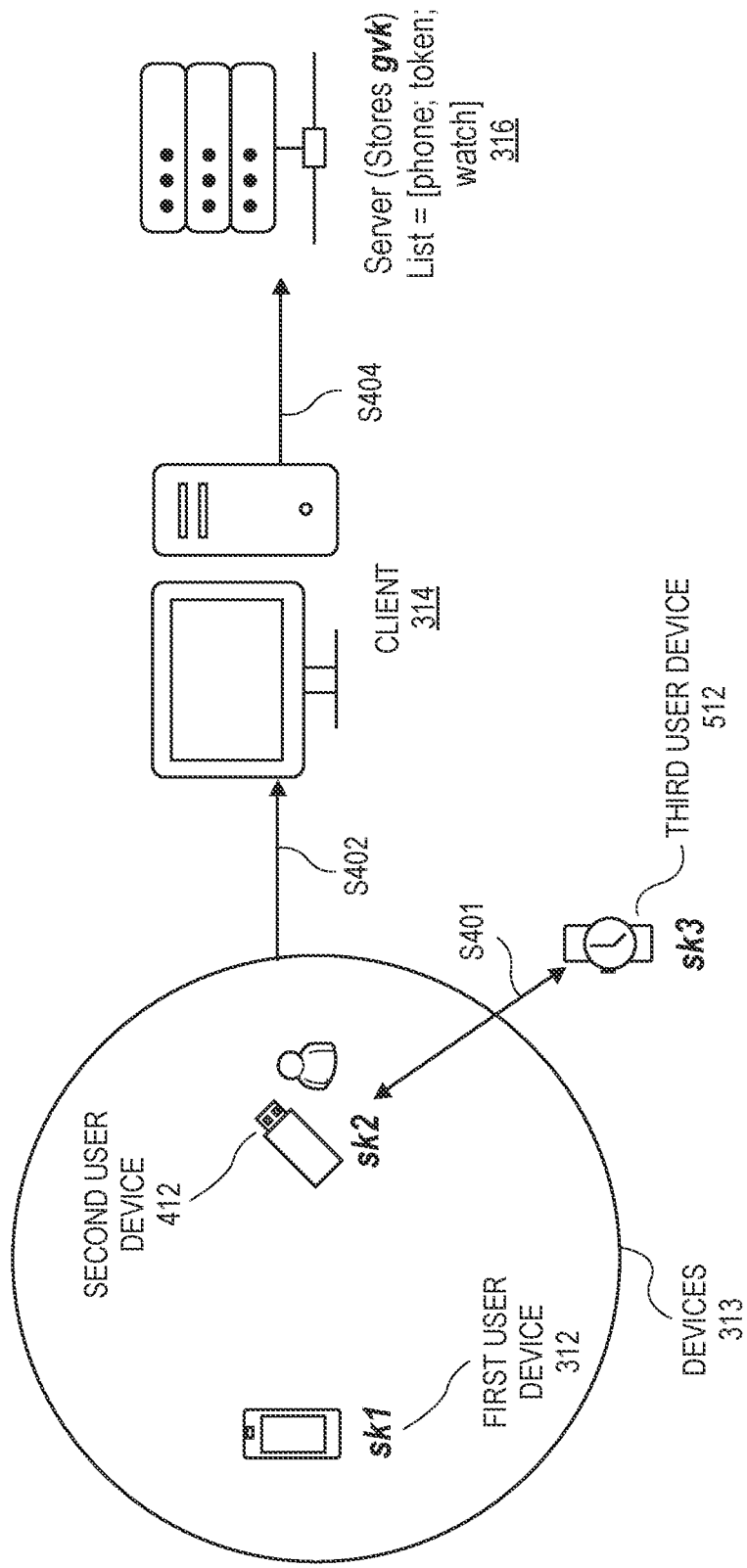
FIG. 3 shows system and a registration/enrollment process for adding a user device to a group of user devices.

FIG. 3 shows a process for adding a user device to a group. A user may, independent of the relying party computer S316, add a user device 512 to the group of user devices (e.g., using the AddMember( )protocol) 313. FIG. 3 shows a group initially comprising a first user device 312 holding a first secret key sk$_1$ and a second user device 412 holding a second secret key sk$_2$.

The user may choose to add a third user device 512 to the group of user devices 313. For example, the user may choose to add a smart watch to the group. The managerless group signature scheme allows the user to add user devices without communicating with the relying party computer S316 (which would traditionally act as a manager). However, in this scenario, the newly added third user device 512 would not be registered to the relying party computer S316, as there is no communication between the device group 313 and the relying party computer S316. Therefore, the system will update the device list (table) in the relying party computer S316 during the first authentication attempt from the new device.

The user can use either the first user device 312 or the second user device 412 to add the third user device 512 to the group of devices 313. In the example of FIG. 3, the user uses the second user device 412 holding the second secret key sk$_2$ to assist the third user device 512 in generating a third secret key sk$_3$. The third secret key sk$_3$ is generated such that neither the second user device 412 nor the first user device 312 learn the secret key sk$_3$ of the third user device 512. Exemplary key generation processes are described above.

In step S401, the second user device 412 adds the third user device 512 to the group of devices 313. During this process, the new secret key (sk$_3$) gets generated for the third user device 512, and the ciphertext (ct) calculated by the third user device 512 gets verified by the second user device 412 and the system, as described above in the add member protocol. Upon successful verification, the third user device 512 becomes the part of the group of user devices 313.

In step S402, the second user device 412 notifies to the client computer C314 that the third user device was added to the group of user devices 313.

In step S404, the client computer C314 relays the information regarding the third user device 512 to the relying party computer S316. The relying party computer S316 may then add the third user device 512 nickname to a group list.

After the registration of the new device in table of the relying party computer S316, the second user device 412 may then transmit group parameters to the third user device 512. For example, the third user device 512 may receive group parameters comprising a group signing key (gsk$_i$), issuing key (ik$_i$), opening key (ok$_i$), and revocation key (rk$_i$).

Further detailed explanations of steps S401, S402, and S404 can further be found in the description associated with FIG. 2, which describes the AddMember protocol.

Figure 4:
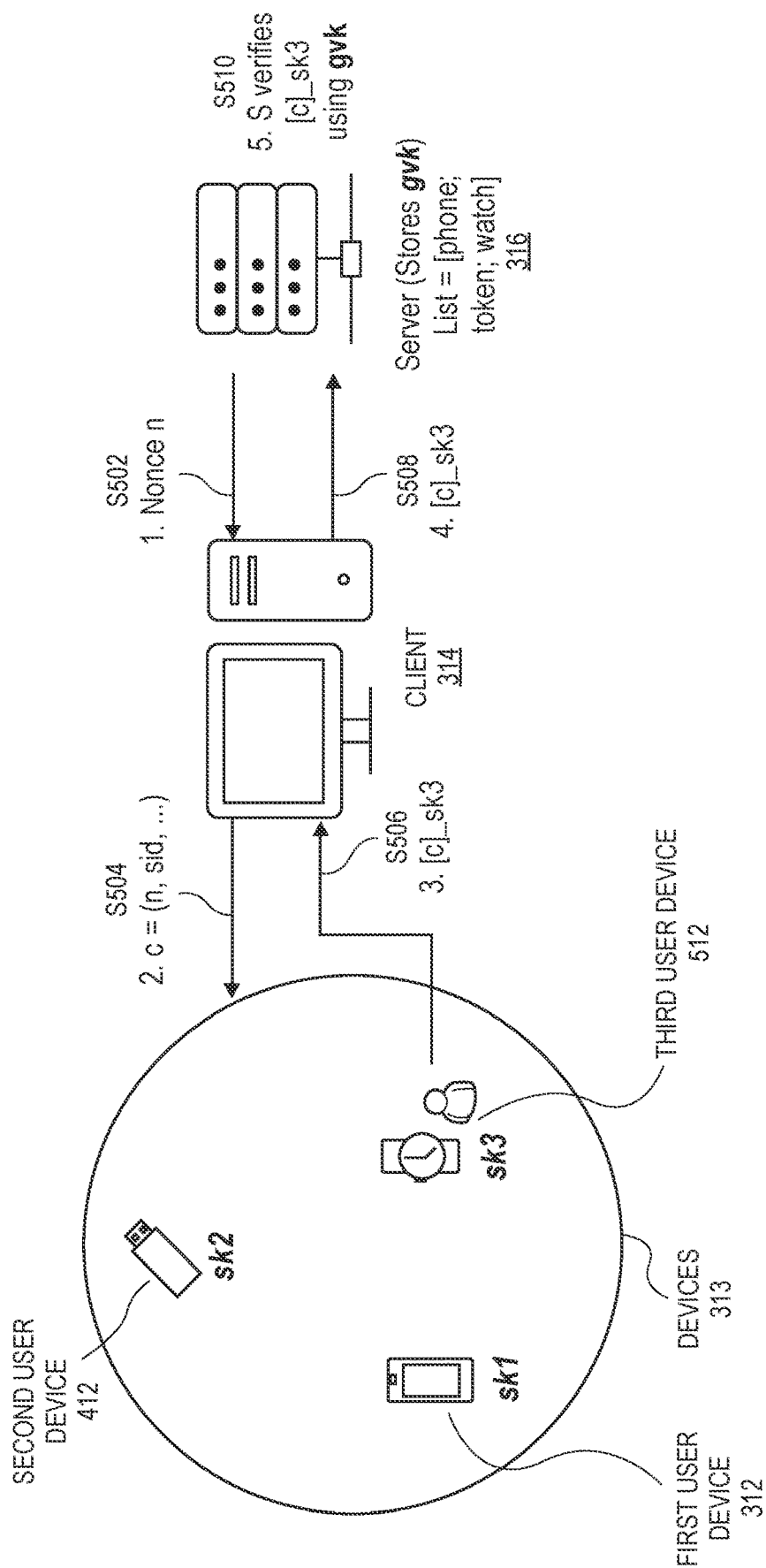
FIG. 4 shows a system and an authentication process using a user device added that was included in a group of user devices.

FIG. 4 shows an authentication process using the third user device 512 that was added to a group of user devices. The process of FIG. 5 may be similar to the process in FIG. 3. Steps S502, S504, S506, S508 are similar to steps S302, S304, S306, and S308 and the descriptions are incorporated herein. However, the user is now able to use the third user device 512 holding a third secret key sk$_3$ to sign the nonce n in S502.

Figure 5:
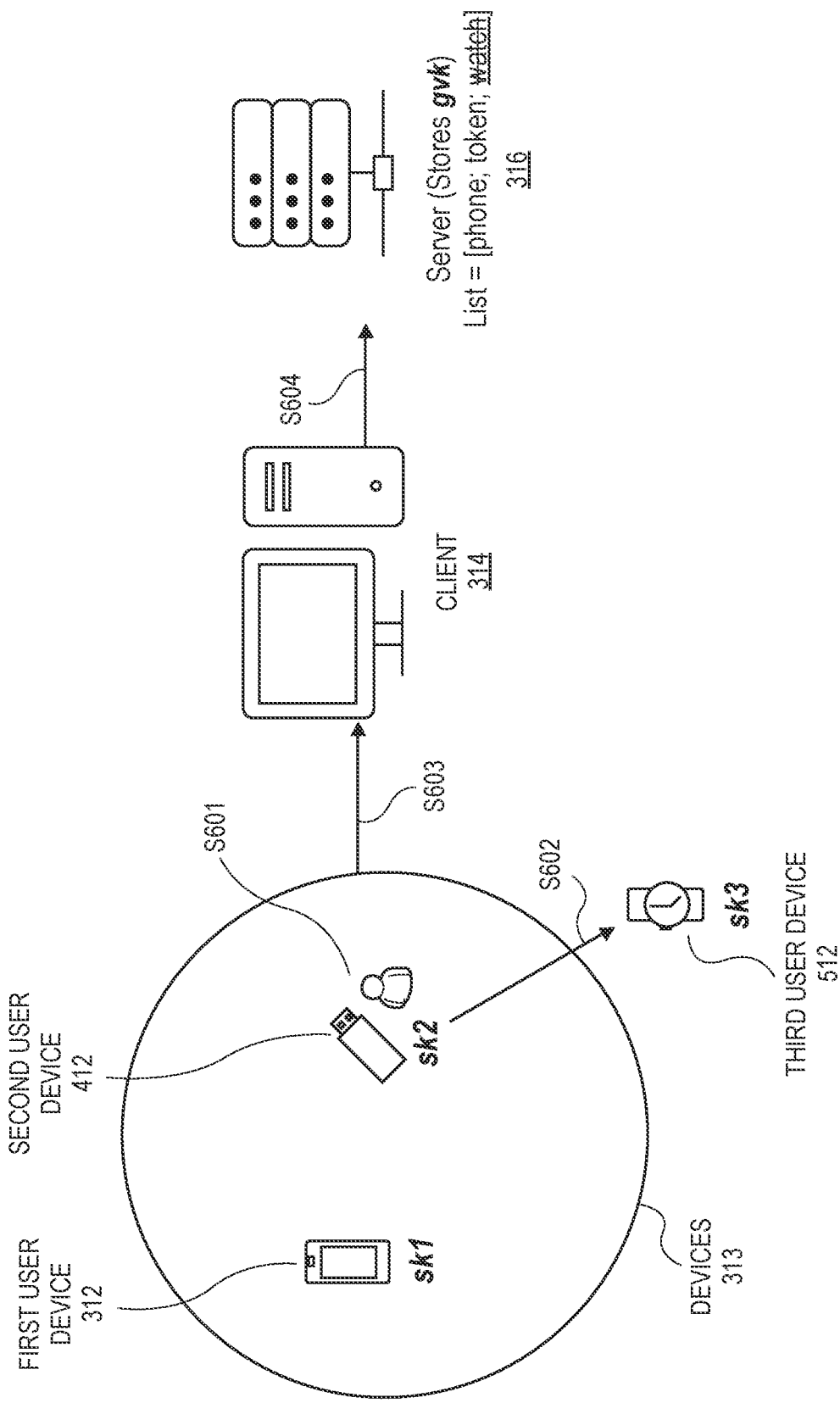
FIG. 5 shows a system and a revocation process for a user device in a group of user devices.

FIG. 5 shows a revocation process for revoking a user device from a group. A user may revoke a user device from the group of user devices (e.g., using the Revoke( )protocol). FIG. 5 shows a group initially comprising a first user device 312 holding a first secret key sk$_1$, a second user device 412 holding a second secret key sk$_2$, and a third user device 512 holding a third secret key sk$_3$.

The user may choose to revoke the membership of the third user device 512 from the group of user devices 313. The user can use either the first user device 312 or the second user device 412 to revoke the third user device 512 from the group of user devices 313. In the example of FIG. 5, the user uses the second user device 412 holding the second secret key (sk$_2$) to revoke the third user device 512 from the group of user devices 313.

In step S601, the second user device 412 verifies that it is able to revoke the membership of another device from the group of user devices 313.

In step S602, the second user device 412 revokes the membership of the third user device 512 in the group of user devices 313.

In step S603, upon the verification of the revocation key (sk$_2$), the information regarding revocation of the third user device 512 is sent from the second user device 412 to the client computer C314.

In step S604, the information regarding the revocation of the third user device 512 is sent from the client computer C314 to the relying computer party S316. The relying computer party S316, upon receiving the information, removes the third user device 512 device from the list in its memory.

After the removal of the third user device 512 in the table, or list, of the relying party computer S316, the second user device 412 may then remove the group privileges of the third user device 512. For example, the third user device 512 may lose sign and revoke privileges. Further, details regarding the revoke member protocol are described above.

Figure 6:
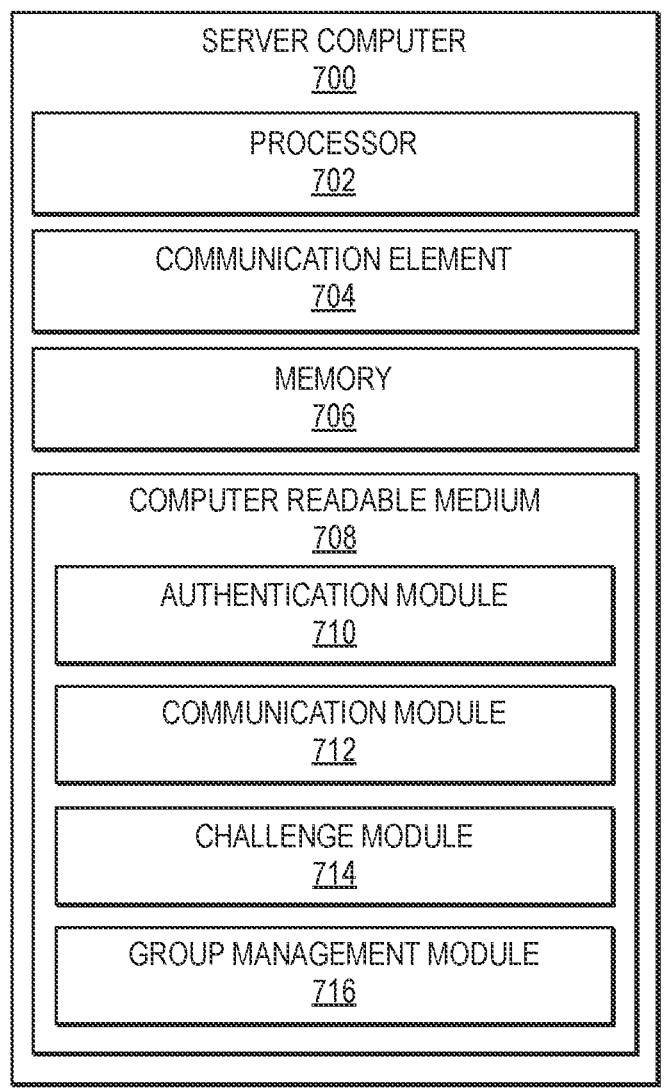
FIG. 6 shows a block diagram of an exemplary server computer according to some embodiments

FIG. 6 shows a block diagram of an exemplary server computer 700 according to some embodiments. Server computer 700 may comprise a processor 702, a communication element 704, memory 706, and a computer readable medium 708. The computer readable medium 708 may comprise a number of software modules, including an authentication module 710, a communication module 712, a challenge module 714, and a group management module 716.

The processor 702 can execute instructions that implement the functions and operations of the server computer 700. Processor 702 may access the computer readable medium 708 and the memory 706 to retrieve data and code needed to cause the server computer 700 to perform the functions described herein.

The communication element 704 may comprise a network interface that may enable server computer 700 to communicate with client machines or user devices.

The memory 706 can store the list of user devices that are registered in the system, or those that are in the group, along with the group verification key (gvk) for the group of user devices.

The authentication module 710 may comprise code that enables processor 702 to authenticate the signatures from the user devices (e.g., using a group verification key).

The communication module 712 may comprise code that enables processor 702 to communicate with other entities. This may include communicating with other user devices and client computers, transmitting the challenge (or nonce) to the client computers or user devices, and receiving the signatures of the challenges from the client computers or user devices.

The challenge module 714 may comprise code or instructions, executable by processor 702 for generating a challenge (e.g., random nonce).

The group management module 716 may comprise code or instructions, executable by processor 702 for managing the user devices that are registered within the group.

Figure 7:
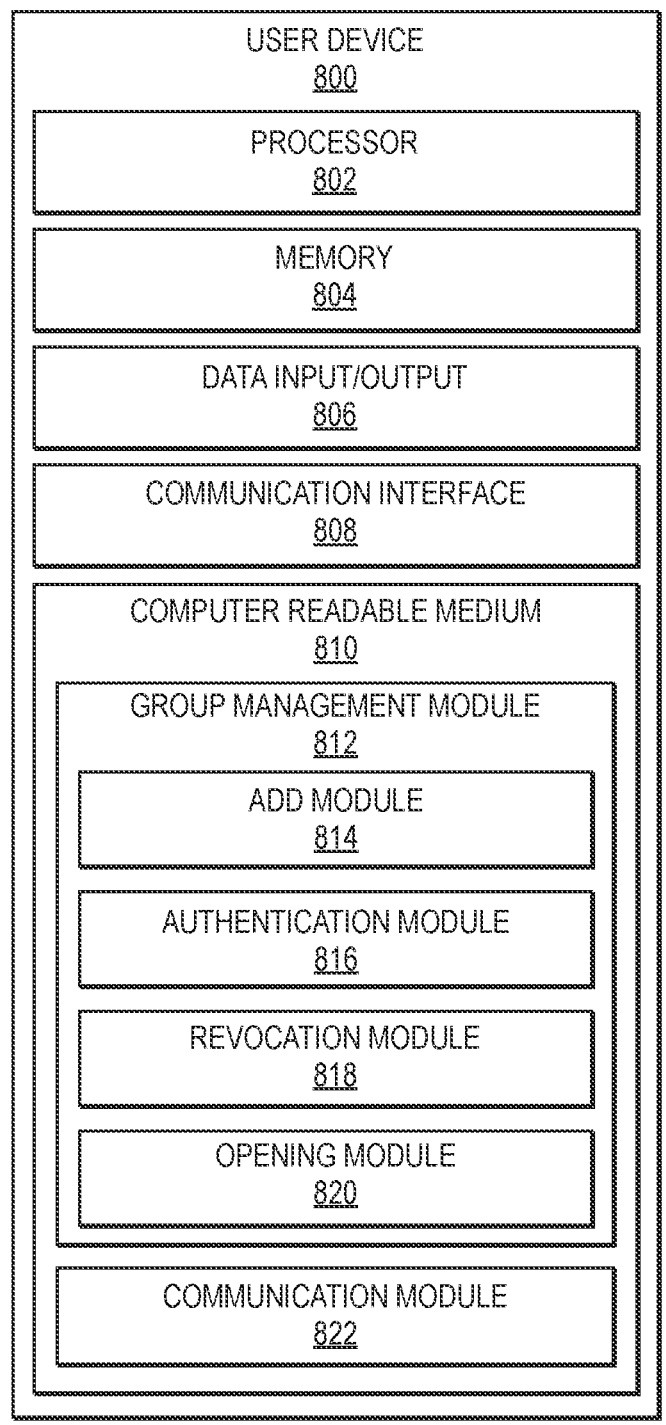
FIG. 7 shows a block diagram of an exemplary user device according to some embodiments.

FIG. 7 shows an exemplary user device 800 according to some embodiments. User device 800 may comprise a processor 802, a memory 804, data input/output elements 806, a communication interface 808, and a computer readable medium 810.

The processor 802 may be a processor that is similar or different than the processor 702 described above.

The memory 804 can store any private keys, public keys, or any other data described herein.

The data input/output elements 806 can include input elements such as a keyboard or touchscreen, and/or output elements such as a display or speaker.

The communication interface 808 may be used to enable data transfer between the user device 800, and the server computer, one or more user devices, and one or more client machines.

The computer readable medium 810 may comprise a number of software modules, including a group management module 812 (which contains an add module 814, an authentication module 816, a revocation module 818, and an opening module 820), and a communication module 822. The computer readable medium 812 may also comprise code, executable by the processor 802 for performing operations comprising: receiving, by a first user device, a challenge from a server computer storing a group verification key, the first user device storing a first secret key and being part of a group of user devices; signing, by the first user device, the challenge from the server computer to produce signed challenge, wherein the server computer verifies the signed challenge using the group verification key; and performing, by the first user device one or more managerial actions with respect to the group of user devices. The computer readable medium 812 may also comprise code, executable by the processor 802 for performing operations comprising providing, by a second user device to a first user device storing a first secret key, a request to be added to a group; receiving, by the second user device from the first user device, input parameters comprising an altered first user device value generated using at least the first secret key, a group verification key, a modulus value, and a scaling parameter; generating, by second user device, a second secret key using the altered first user device value, the modulus value and a random number chosen in a space defined by the modulus value, and the scaling parameter; and storing, by the second user device, the second secret key, wherein the second user device is then added as a member of the group, wherein the first secret key and the second secret key are different and can sign a challenge, which can be verified by the group verification key.

The group management module 812 can include at least four modules (add module 814, authentication module 816, revocation module 818, and opening module 820).

The add module 814 may comprise code or instructions, executable by the processor 802 for adding a new user device to the group of user devices.

The authentication module 816 may comprise code or instructions, executable by the processor 802 for generating the signature on a challenge in an authentication process.

The revocation module 818 may comprise code or instructions, executable by the processor 802 for revoking the membership of a user device from a group of user devices.

The opening module 820 may comprise code or instructions, executable by the processor 802 for checking a signature generated from another device and determining which user device created the signature.

The communication module 822 may comprise code that enables processor 802 to communicate with other entities. This may include communicating with other user devices, client machines, or server computers.

Any of the software components or functions described in this application may be implemented as software code to be executed by a processor using any suitable computer language such as, for example, Java, C, C++, C #, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:

1. A method comprising:
   receiving, by a first user device, a challenge from a server computer storing a group verification key, the first user device storing a first secret key and being part of a group of user devices;
   signing, by the first user device, the challenge from the server computer to produce signed challenge, wherein the server computer verifies the signed challenge using the group verification key; and
   performing, by the first user device, one or more managerial actions with respect to the group of user devices, wherein the one or more managerial actions comprises performing a user device adding process of adding a second user device to a group including the first user device, the adding process comprising:
   generating, by the first user device in association with the second user device, a second secret key on the second user device, wherein the second secret key is derived from the first secret key stored on the first user device;
   generating, by the first user device, a first commitment, wherein the second user device also generates a second commitment;
   exchanging, between the first user device and second user device, the first commitment and the second commitment;
   receiving, by the first user device from the second user device, a ciphertext, wherein the ciphertext is generated using at least the first commitment and the second commitment;
   verifying, by the first user device, the ciphertext; and
   in response to verifying the ciphertext, modifying the group to include the second user device.

2. The method of claim 1, wherein generating the second secret key includes using a modified El Gamal or Schnorr algorithm to generate the second secret key.

3. The method of claim 1, further comprising:
   transmitting, by the first user device group parameters to the second user device.

4. The method of claim 1, wherein the server computer is a relying party computer.

5. The method of claim 1, wherein the one or more managerial actions comprises performing a user device revocation process of revoking membership of the second user device from the group of user devices.

6. The method of claim 1, wherein the one or more managerial actions comprises performing an identification process of identifying a user device in the group of user devices that signed another challenge in an authentication process.

7. The method of claim 1, wherein the first user device is a mobile phone or a smart watch.

8. The method of claim 7, wherein the challenge is a random value generated by the server computer.

9. The method of claim 1, wherein the server computer maintains a list of user devices in the group of user devices.

10. The method of claim 1, wherein the challenge is a first challenge, the signed challenge is first signed challenge, and the method further comprises:
   receiving, by the second user device, a second challenge from the server computer, the second user device storing the second secret key and being part of the group of user devices; and
   signing, by the second user device, the second challenge from the server computer to produce second signed challenge, wherein the server computer verifies the second signed challenge using the group verification key.

11. The method of claim 10, wherein the server computer is a relying party server computer, and the first user device is a mobile phone and the second user device is an authentication token.

12. The method of claim 10, wherein the first user device and the second user device are operated by a same user.

13. The method of claim 10, wherein the one or more managerial actions includes a process of adding a third user device to the group of user devices.

14. A first user device comprising:
   a processor; and
   a computer readable medium comprising code executable by the processor for performing operations including:
   receiving a challenge from a server computer storing a group verification key, the first user device storing a first secret key and being part of a group of user devices;
   signing the challenge from the server computer to produce signed challenge, wherein the server computer verifies the signed challenge using the group verification key; and
   performing one or more managerial actions with respect to the group of user devices,
   wherein the one or more managerial actions comprises performing a user device adding process of adding a second user device to a group including the first user device, the adding process comprising:
   generating, by the first user device in association with the second user device, a second secret key on the second user device, wherein the second secret key is derived from the first secret key stored on the first user device;
   generating, by the first user device, a first commitment;
   transmitting, by the first user device to the second user device, the first commitment;
   receiving, by the first user device from the second user device, a second commitment;
   receiving, by the first user device from the second user device, a random value and a ciphertext, wherein the ciphertext is generated using the first commitment, the second commitment, and the random value;
   verifying, by the first user device, the ciphertext; and
   in response to verifying the ciphertext, modifying the group of user devices to include the second user device.

15. The first user device of claim 14, wherein the first user device is a mobile phone.

16. The first user device of claim 14, wherein the one or more managerial actions comprises performing an identification process of identifying a user device that signed another challenge in an authentication process.

17. The first user device of claim 14, wherein the challenge is a random nonce.

18. A system comprising:
   a group of user devices comprising at least a first user device and a second user device, wherein the first user device comprises:
   a processor; and
   a computer readable medium comprising code executable by the processor for performing operations including:
   receiving a challenge from a server computer storing a group verification key, the first user device storing a first secret key and being part of the group of user devices;
   signing the challenge from the server computer to produce signed challenge, wherein the server computer verifies the signed challenge using the group verification key; and
   performing one or more managerial actions with respect to the group of user devices,
   wherein the one or more managerial actions comprises performing a user device adding process of adding the second user device to a group including the first user device, the adding process comprising:
   generating, by the first user device in association with the second user device, a second secret key on the second user device, wherein the second secret key is derived from the first secret key stored on the first user device;
   generating, by the first user device, a first commitment;
   transmitting, by the first user device to the second user device, the first commitment;
   receiving, by the first user device from the second user device, a second commitment;
   receiving, by the first user device from the second user device, a random value and a ciphertext, wherein the ciphertext is generated using the first commitment, the second commitment, and the random value;
   verifying, by the first user device, the ciphertext; and
   in response to verifying the ciphertext, modifying the group of user devices to include the second user device.

19. The system of claim 18, wherein the first user device is a mobile phone and the second user device is a wearable device or a hardware authentication device.

20. The method of claim 1, further comprising:
   using, the second user device to perform a passwordless authentication process during a payment transaction conducted with the second user device.

* * * * *